Figure 1:
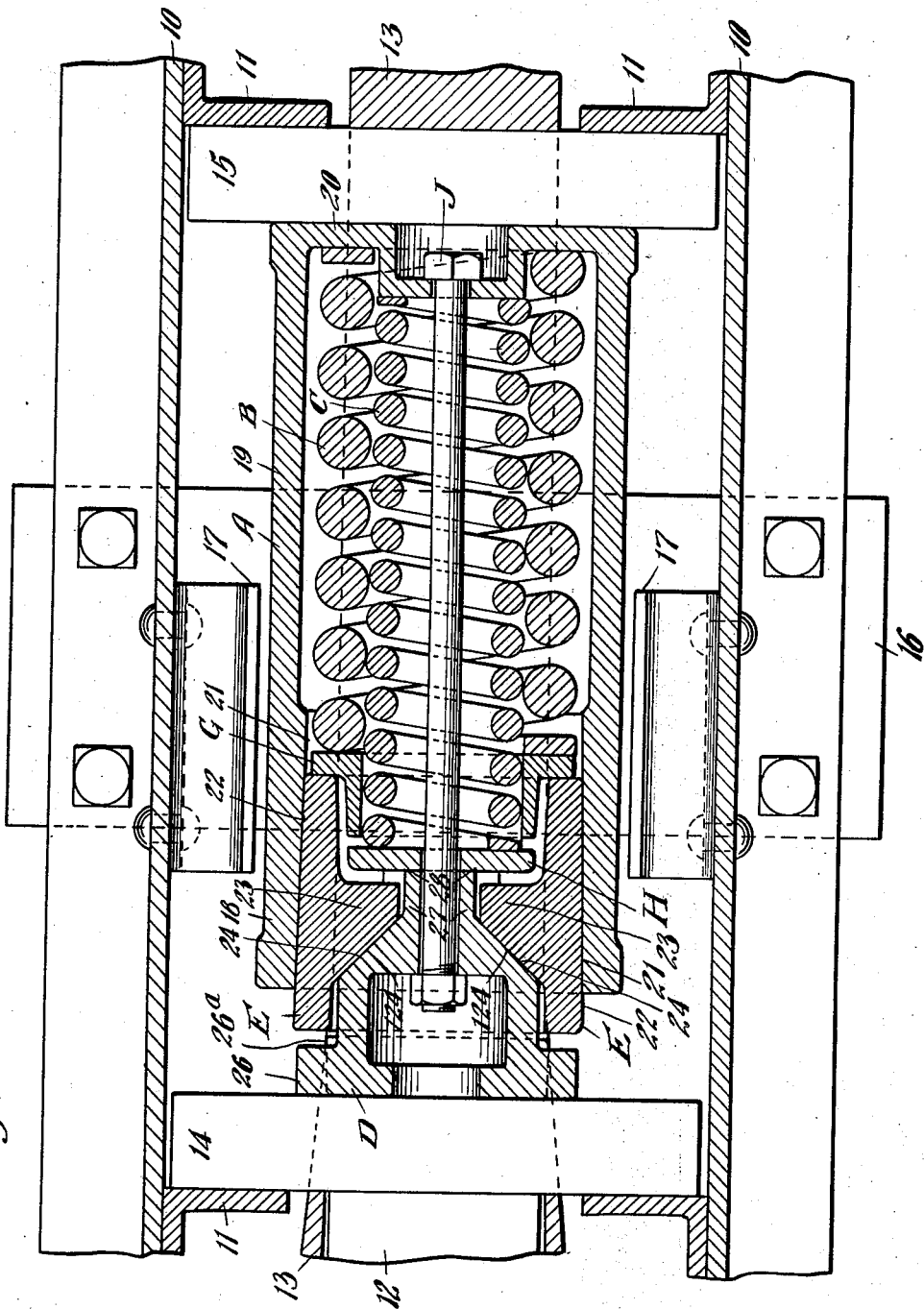

Feb. 8, 1927.

J. F. O'CONNOR 1,616,757

FRICTION SHOCK ABSORBING MECHANISM

Filed Oct. 12, 1923  2 Sheets-Sheet 1

Witnesses
Wm. Geiger

Inventor
John F. O'Connor
By George J. Haight
His Atty.

Feb. 8, 1927. 1,616,757
J. F. O'CONNOR
FRICTION SHOCK ABSORBING MECHANISM
Filed Oct. 12, 1923   2 Sheets-Sheet 2
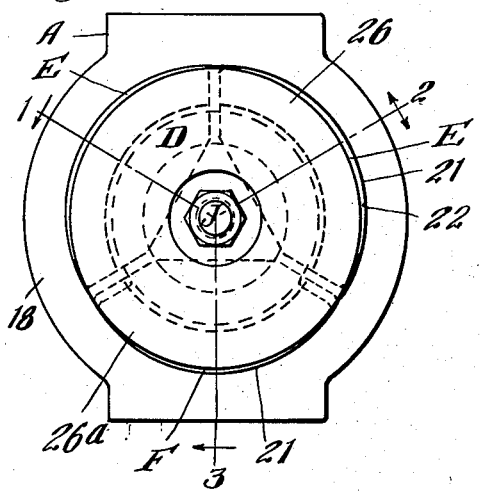
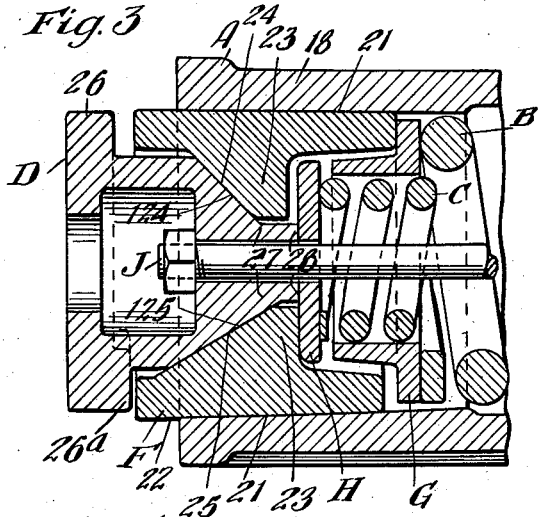
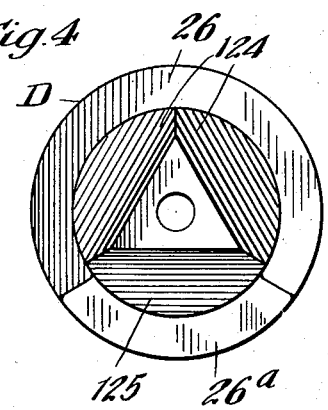
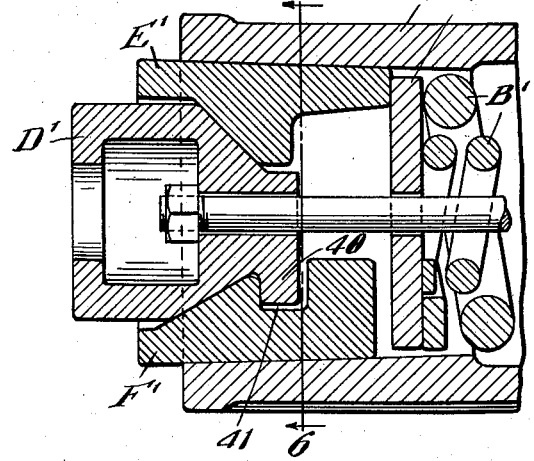
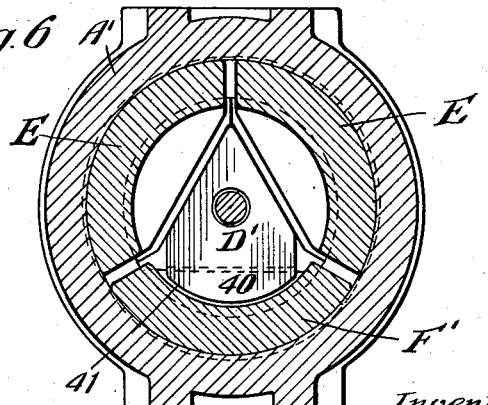

Patented Feb. 8, 1927.

1,616,757

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed October 12, 1923. Serial No. 668,056.

This invention relates to improvements in friction shock absorbing mechanisms.

One object of the invention is to provide a friction shock absorbing mechanism, especially adapted for railway draft riggings, wherein are obtained high resistance, easy and graduated action, and certain release by means of relatively few parts all of economic construction.

More specifically, the object of my invention is to provide in a mechanism of the character indicated and of that type employing blunt and keen angles for effecting the wedging action, means so arranged as to limit to a predetermined amount the relative longitudinal movement between the pressure transmitting member and the keen angle shoe or shoes in order to thereby keep the ultimate stresses which will be set up in the mechanism within predetermined limits. The invention is in the nature of an improvement upon that type of mechanism more fully described and claimed in my co-pending application No. 610,198, filed January 2, 1923, for improvements in friction shock absorbing mechanisms and to which reference may be had for a more complete description of the general operation of a mechanism employing blunt and keen angle wedge faces similar to those disclosed in this application.

In the drawings forming a part of this specification, Figure 1 is a horizontal longitudinal sectional view of a portion of a railway draft rigging showing my improvement in connection therewith, the section of the shock absorbing mechanism proper corresponding to two intersecting planes at 120° apart, as indicated by the section lines 1—2 of Figure 2. Figure 2 is an end elevation of the shock absorbing mechanism proper. Figure 3 is a view similar to Figure 1 of the shock absorbing mechanism proper, the section corresponding, however, to the two intersecting planes indicated by the lines 2—3 of Figure 2. Figure 4 is an end elevation of the pressure transmitting wedge employed in my construction. Figure 5 is a view similar to Figure 3 illustrating a modified form of the improvement. And Figure 6 is a vertical transverse section corresponding to the line 6—6 of Figure 5.

Referring first to the construction illustrated in Figures 1 to 4, inclusive, 10—10 indicate the usual car draft sills, to the inner faces of which are secured front and rear stop lugs 11—11 of usual construction. A portion of a draw-bar is indicated at 12, the same being operatively associated with the shock absorbing mechanism proper by a hooded cast yoke 13 within which is disposed said mechanism and front and rear followers 14 and 15. The yoke and parts therewithin are supported in operative position by a detachable saddle plate 16. The mechanism is of that character employing a substantially cylindrical shell and in order to maintain it in central position I preferably employ guide plates 17—17 secured to the inner faces of the draft sills, as indicated in Figure 1.

The improved mechanism comprises, broadly, a combined friction shell and spring cage casting A; a spring resistance comprised of an outer coil B and an inner coil C; a pressure transmitting wedge D; two blunt angle friction shoes E—E; a keen angle friction shoe F; two spring followers G and H; and a retainer bolt J.

The casting A, as heretofore mentioned, is of substantially cylindrical form throughout and has a friction shell proper 18 formed at its front or outer end with the spring cage proper 19 rearwardly thereof. An integral transverse rear wall 20 is provided, the same bearing upon the rear follower 15. The interior of the shell 18 is preferably formed with three, uniformly spaced, independent, cylindric friction surfaces 21, said surfaces being converged inwardly of the shell and so arranged that at their inner ends they merge to form a true cylinder.

The two friction shoes E are of like construction and each has an outer longitudinally extending cylindric friction surface 22 co-operable with one of the corresponding shell surfaces 21. On its inner side, each shoe E is provided with an enlargement 23, the front of which is beveled or inclined, as indicated at 24, to provide a wedge face extending at a blunt angle with respect to the axis of the mechanism and the lines of applied force. The shoe F is similar to the shoes E except that it is provided with a much keener wedge face 25.

The pressure transmitting wedge D is formed at its front or outer end with a heavy flanged section 26 which bears against the front follower 14. That portion of the flange 26 which is opposite the adjacent end of the keen angle shoe F is made thicker, as indicated at 26ª best in Figure 3, where it will be noted that a much lesser clearance is left between said flange and the shoe F than between the main portion of the flange 26 and the ends of the shoes E. Inwardly of the flanged section the wedge D is provided with three wedge faces 124—124 and 125 extending at the same angles as, and cooperable with, the blunt wedge faces 24 of the two shoes E and the keen angle wedge face 25 of the shoe F, respectively. At its inner end, the wedge D is formed with an extension 27 having a flat inner end 28 which bears against the spring follower H, it being observed that the latter is spaced from the enlargements 23 of all shoes when the parts are in full release, as shown in Figure 1. Said spring follower H is engaged by the inner coil C only. The other spring follower G engages the inner ends of the friction shoes on one side and the adjacent end of the outer heavy coil B on the other side.

The operation of the mechanism is as follows, assuming a buff action. As the drawbar 12 and follower 14 move toward the right, as viewed in Figure 1, the wedge D will be moved in unison therewith. An initial wedging action is set up between the keen angle wedge faces 25 and 125, and there will be a corresponding reaction exerted from the shoes E to the wedge D. As the pressure is continued on the wedge D, the latter will move longitudinally with reference to the shoe F, thus increasing the wedging action until the point is reached where the section 26ª of the wedge flange engages the outer end of the keen angle shoe F. Thereafter, further relative longitudinal movement between the wedge and shoe F is prevented and the maximum spreading action thereby determined. During the movement of the wedge and friction shoes, due to the converged friction surfaces of the shell, a differential action will take place which is accommodated on the blunt angle sets of faces 24 and 124. The angles of the faces 24 and 124 will preferably be made such that there will be no appreciable wedging action on said faces during the compression stroke—that is to say, said faces 24 and 124 will be of a substantially non-wedge-acting character with respect to forces applied parallel to the center line of the mechanism, for reasons more fully stated in my co-pending application No. 610,198.

In actual practice, I prefer that the spring follower G do not engage the inner end of the keen angle shoe F, which condition is best illustrated by Figure 3, but the shoe F will be afforded sufficient resistance to insure the setting up of the wedge action by reason of the resistance afforded by the inner coil C acting through the follower H, which engages, normally, the shoulder provided by the enlargement 23 of the shoe F. As will be understood, when the wedge D is shifted longitudinally of the shoe F, said follower H will be disengaged from the shoe F but the resistance will still be effective to resist movement of the shoe F relative to the shell. In the release action, due to the bluntness of the angles of the faces 24 and 124, the wedge D will readily disengage itself from between the shoes, or at least sufficiently to effect collapse of the friction unit, this collapse being induced both by the spring coil C and by the laterally inwardly and radially directed forces that will have been stored up in the friction shell during the compression stroke.

With the construction above described, it is evident that the amount of relative longitudinal movement between the wedge D and keen angle wedging shoe F can be limited as desired and thereby the maximum stresses set up in the shell kept within predetermined limits. The improved mechanism embodies all the advantages of the broader invention of the keen and blunt angle wedge faces more fully described in my said application No. 610,198 to which reference may be had for a more detailed description.

Referring next to the construction illustrated in Figures 5 and 6, A' indicates the friction shell which is similar in construction to the shell shown in the preceding figures. The two blunt angle friction shoes are indicated at E'—E' and the keen angle shoe at F'. A corresponding pressure transmitting wedge D is employed, the latter having wedge faces co-operable with the respective wedge faces of the blunt and keen angle shoes.

In the modification shown in Figures 5 and 6, the wedge D' is provided at its inner end with a laterally extending lug 40 which enters a corresponding recess 41 provided in the keen angle shoe F' and by which the two parts are interlocked with provision for a predetermined amount of relative longitudinal movement of the wedge D' inwardly with respect to the shoe F'. In this form of the invention also, both coils of the spring resistance B' bear upon a single spring follower G' which is engaged with the inner ends of the two blunt angle shoes E'—E'. The operation will be the same as that above described in connection with the first embodiment of the invention, it being evident that the keen angle shoe F' will be restored to its normal position during the release action, by the wedge D' through the lug 40.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a friction member having longitudinally extending friction surfaces converged in a direction of the length of said member; of a spring resistance; friction shoes co-operable with the friction surfaces of said member, one shoe having a wedge face extending at a relatively keen angle to the line of applied force and another shoe having a face inclined at a relatively blunt and releasing angle with respect to the line of applied force; pressure transmitting wedging means having inclined faces corresponding to and co-operable with the inclined faces of the shoes and means co-operating with said keen angle shoe only for limiting the relative longitudinal shifting between said wedging means and said last named shoe.

2. In a friction shock absorbing mechanism, the combination with a friction shell having interior friction surfaces converged inwardly of the shell; of a spring resistance; a plurality of friction shoes co-operable with the shell friction surfaces, said shoes being provided on their inner sides with faces inclined relative to the axis of the shell and the inclined face of at least one shoe extending at a more acute angle than the inclined face of another shoe; wedge pressure transmitting means having correspondingly inclined faces engaging and co-operable with said inner inclined faces of the shoes; and means limiting, to a predetermined amount the relative longitudinal shifting between said wedge pressure transmitting means and that shoe having the more acutely inclined face, said limiting means co-operating with said keen shoe only.

3. In a friction shock absorbing mechanism, the combination with a shell; of a spring resistance; friction shoes slidable within said shell; a movable wedge acting between the shoes, said shoes having inner faces inclined one to the other at an angle from within which the wedge is readily releasable upon discontinuance of the actuating compression force, the inner face of one of said shoes being at an acute angle to create high frictional capacity in the mechanism and of such an acute angle per se that the initial collapse of the shoe and wedge must necessarily occur on other faces; and means co-operating only with said shoe having said acute angle face for limiting the relative longitudinal movement between said wedge and last named shoe.

4. In a friction shock absorbing mechanism, the combination with a friction member provided with longitudinally extending friction surfaces; of a spring resistance; friction elements having also longitudinally extending friction surfaces co-operable with the friction surfaces of said member, one element having a face inclined at a keen wedge angle relative to the axis of said member and another member having a face inclined at a relatively blunt releasing angle relative to the axis of said member; a one-piece member having inclined faces co-acting directly with said inclined faces of said elements; and co-operating shoulders on said member and element having an inclined face at a keen wedge angle to limit, to a predetermined amount, the relative longitudinal movement between said member and last named shoe only.

5. In a friction shock absorbing mechanism, the combination with a friction shell having interior, independent, cylindric friction surfaces converged inwardly of the shell; of a spring resistance; a friction shoe co-operable with each of said cylindric friction surfaces of the shell, all of said shoes having inner faces inclined to the axis of the shell and one of said faces extending at an acute wedging angle and remaining faces extending at a relatively blunt releasing angle with respect thereto; a pressure transmitting wedge having inclined faces co-operable with the respective inclined faces of said shoes; and means co-operating only with said shoe having the keen angle face for limiting the relative longitudinal movement between said shoe having the keen angle face and said wedge.

6. In a friction shock absorbing mechanism, the combination with a friction shell having interior, independent, cylindric friction surfaces converged inwardly of the shell; of a spring resistance; a friction shoe co-operable with each of said cylindric friction surfaces of the shell, all of said shoes having inner faces inclined to the axis of the shell and one of said faces extending at an acute wedging angle and the remaining faces extending at a relatively blunt non wedge-acting angle with respect thereto; a pressure transmitting wedge having inclined faces co-operable with the respective inclined faces of said shoes; and means co-operating only with said shoe having the keen angle face for limiting the relative longitudinal movement between said shoe having the keen angle face and said wedge, said means including a lateral projection on said wedge co-operable with a corresponding adjacent shoulder on said shoe.

7. In a friction shock absorbing mechanism, the combination with a friction shell having interior, independent, cylindric friction surfaces converged inwardly of the shell; of a spring resistance; a friction shoe co-operable with each of said cylindric friction surfaces of the shell, all of said shoes having inner faces inclined to the axis of the shell and one of said faces extending at an acute wedging angle and the remaining faces extending at a blunt non wedge acting angle with respect thereto; a pressure transmitting wedge having inclined faces co-operable with the respective inclined faces of said shoes; and means co-operating only with said shoe having the keen angle face for limiting the relative longitudinal movement between said shoe having the keen angle face and said wedge, said means including a laterally extending flange on the wedge disposed opposite and adapted to engage the outer end of said shoe.

In witness that I claim the foregoing I have hereunto subscribed my name this 10th day of October 1923.

JOHN F. O'CONNOR.